United States Patent [19]
Bruce et al.

[11] Patent Number: 5,396,566
[45] Date of Patent: Mar. 7, 1995

[54] ESTIMATION OF BASELINE, LINE SPACING AND CHARACTER HEIGHT FOR HANDWRITING RECOGNITION

[75] Inventors: Wilker S. Bruce, Boca Raton, Fla.; Joonki Kim, White Plains, N.Y.; Donald B. Matson, Boca Raton; William D. Modlin, Boca Raton, both of Fla.

[73] Assignee: International Business Machines Corporation, Armonk, N.Y.

[21] Appl. No.: 25,511

[22] Filed: Mar. 4, 1993

[51] Int. Cl.⁶ .............................................. G06K 9/32
[52] U.S. Cl. ......................................... 382/46; 382/13
[58] Field of Search ................... 382/13, 9, 46, 41, 44

[56] References Cited

U.S. PATENT DOCUMENTS

| | | | |
|---|---|---|---|
| 4,024,500 | 5/1977 | Herbst et al. | 340/146.3 |
| 4,845,768 | 7/1989 | Kochert et al. | 386/46 |
| 4,972,496 | 11/1990 | Sklarew | 382/13 |
| 5,001,765 | 3/1991 | Jeantry | 382/13 |
| 5,111,514 | 5/1992 | Ohta | 382/46 |
| 5,138,668 | 8/1992 | Abe | 382/13 |

OTHER PUBLICATIONS

IBM Technical Disclosure Bulletin, vol. 25, #10, Mar. 1983 J. Kim "Baseline Drift Correction of Handwritten Text".

*Primary Examiner*—Yon J. Couso
*Attorney, Agent, or Firm*—Jack M. Arnold; Robert P. Tassinari, Jr.

[57] ABSTRACT

A line space baseline adjuster in a handwriting recognition system achieves improved recognition accuracy by normalizing the Cartesian coordinates of the writings captured by a digitizer to coincide with prototype character space. The normalization techniques include weighted average estimation, prototype extraction estimation, extreme point clustering estimation and a combination of prototype extraction estimation and extreme point clustering estimation.

6 Claims, 8 Drawing Sheets

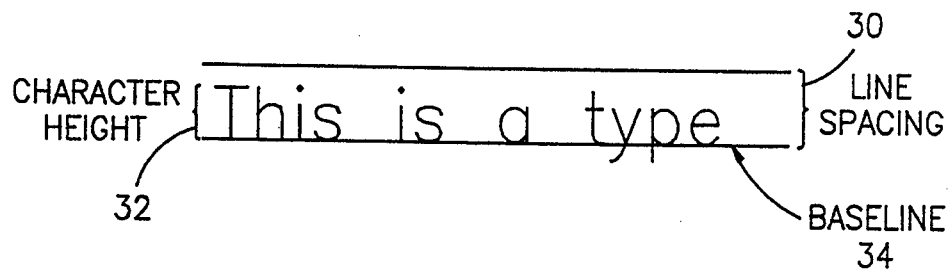
FIG.2
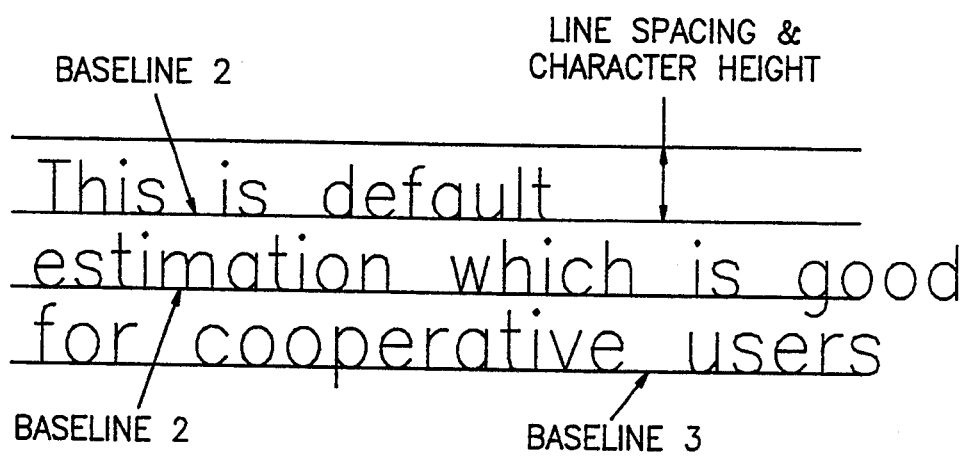
FIG.3
FIG.4

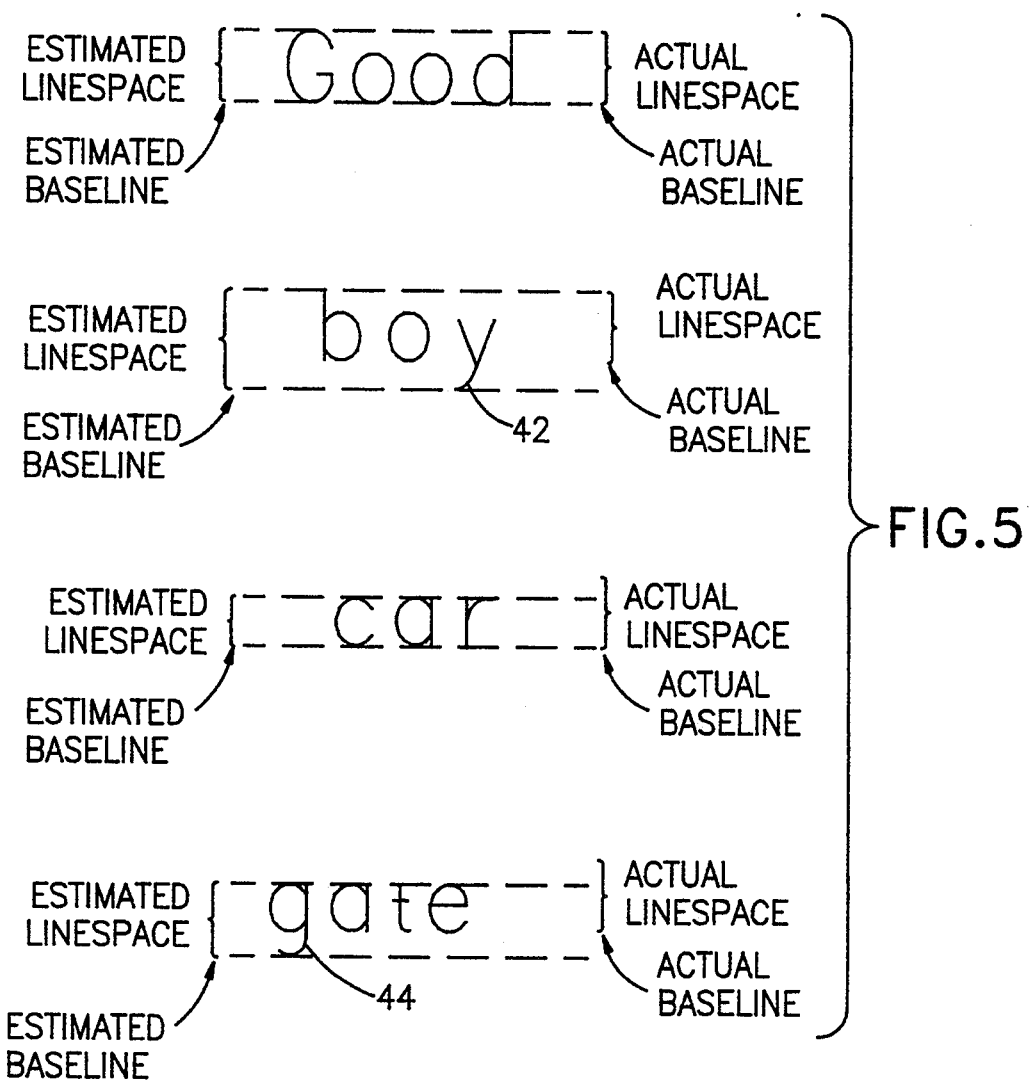
FIG. 5
FIG. 6
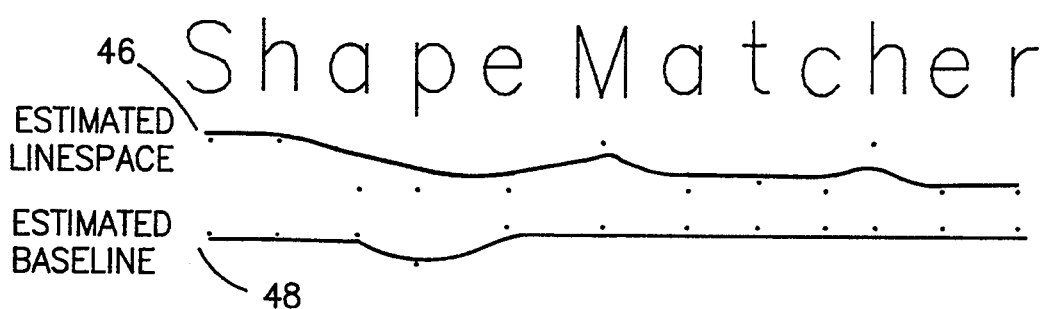

ESTIMATION OF BASELINE, LINE SPACING AND CHARACTER HEIGHT FOR HANDWRITING RECOGNITION

FIELD OF THE INVENTION

The invention is in the field of signal processing, and in particular is directed to handwriting recognition. Specifically, the invention is directed to improving recognition accuracy by normalizing Cartesian coordinates of characters written to coincide with character prototype coordinate space.

BACKGROUND OF THE INVENTION

In handwriting recognition systems, writing areas are usually marked with lines to guide the user in the placement of the writing. Writing entered by a user is captured by a digitizer and sent to a pattern matcher where the writing is then matched against prototype patterns which represent handwriting units (characters) which can be recognized by the system. As part of the matching process, the Cartesian coordinates of the writing as captured by the digitizer must be normalized to coincide with the prototype coordinate space.

Normalization of coordinates is an important factor in obtaining high recognition accuracy. Information used in the process of obtaining a correct normalization include measurements such as line spacing, and the location of the baseline. Due to the natural variations in writing style between users and within the writing of a single user, these values can vary significantly from those suggested by the lines provided by the system in the writing areas. Since the normalization is critical to the success of the pattern matching algorithm, it is required that handwriting recognition systems provide an accurate on-going estimation of line spacing, and baseline placement values to achieve high rates of recognition accuracy.

There are a number of patents and articles directed to handwriting recognition, each having certain advantages and disadvantages.

U.S. Pat. No. 4,024,500 to Herbst et al discloses a method and apparatus for effecting character segmentation in a cursive script handwriting analysis system which comprises obtaining the continuous x and y coordinates and the x and y velocities of a writing instrument forming said cursive character. Continuously averaging the x displacement associated with all the x and y extremal points of a handwritten character where the x or the y velocity equals zero. Successively examining the x displacement for each x-extremal and determining if the x displacement of said extremal exceeds a predetermined threshold value relative to the average x displacement of the current character and if so, indicating that said new extremal is located in the next character and that a segmentation mark should be placed at a predetermined distance along the ligature between the just analyzed extremal and the previously analyzed extremal. The results of this segmentation are then communicated to a character recognition mechanism whose efficiency and accuracy is greatly enhanced by said segmentation indication. The system, as designed, is also able to follow deviations from the baseline and mid-zone line as the writing progresses.

U.S. Pat. No. 4,845,768 to Kochert et al discloses an editing arrangement for character recognition which has a binary coded character stored in a X/Y-addressable image signal memory from which signals are first read out column-by-column, whereby a first character shadow is formed from the result by projection of successive columns respectively comprising black points onto the character baseline. The stored character pattern is then repeatedly read out in accord with a scanning at positive and/or negative oblique angles relative to the Y-axis until a minimum character shadow is produced. The scanned pattern yielding this minimum character shadow is then selected for further evaluation of the character.

U.S. Pat. No. 4,972,496 to Sklarew discloses a keyboardless entry computer system which includes a transparent input screen that generates positional information when contacted by a stylus, and a display screen mounted physically below the input screen such that a character that is displayed can be seen below the input screen. The system includes a computer that has been programmed to compile the positional information into Strokes, to calculate Stroke characteristics, and then compare the Stroke characteristics with those stored in a database in order to recognize the symbol drawn by the stylus. Key features of the system are: 1) transparent position sensing subsystem; 2) underlying display on which to mimic drawing of sensed positions and to show characters or symbols; 3) means to convert sensed positions first into plotted Points and then into recognized characters or symbols; and 4) means to "learn" to associate sensed input positions with a character or symbol.

IBM Technical Disclosure Bulletin, Vol. 25, No. 10, March 1983, pages 5111–5114, in an article entitled "Baseline Drift Correction of Handwritten Test" by J. Kim divides a given word into smaller units. Each unit is a box of equal width and high enough to enclose all the points that lie within its width. Such boxes are uniformly spaced over the word. Then it is possible to analyze the relative position of the boxes and detect how they go up or down. The average dy/dx of the boxes is the amount of drift, which will be used for correction.

According to the present invention, baseline, line spacing and character height information used in recognizing handwriting is estimated through extraction from previously recognized words and through heuristic application of clustering of stroke y-coordinate extreme points to improve handwriting recognition accuracy.

DISCLOSURE OF THE INVENTION

A line space baseline adjuster in a handwriting recognition system achieves improved recognition accuracy by normalizing the Cartesian coordinates of the writings captured by a digitizer to coincide with prototype character space. The normalization techniques include weighted average estimation, prototype extraction estimation, extreme point clustering estimation and a combination of prototype extraction estimation and extreme point clustering estimation.

BRIEF DESCRIPTION OF THE DRAWINGS

FIG. 2 is a diagram showing a baseline, line spacing and character height in a handwriting recognition system;

FIG. 3 is a diagram showing drifting handwriting in a handwriting recognition system;

FIG. 4 is a diagram showing default estimation in a handwriting recognition system;

FIG. 5 is a diagram showing estimation based upon maximum and minimum y-coordinate values of a segment;

FIG. 6 is a diagram showing a weighted average estimation;

BEST MODE OF CARRYING OUT THE INVENTION

Figure 1:
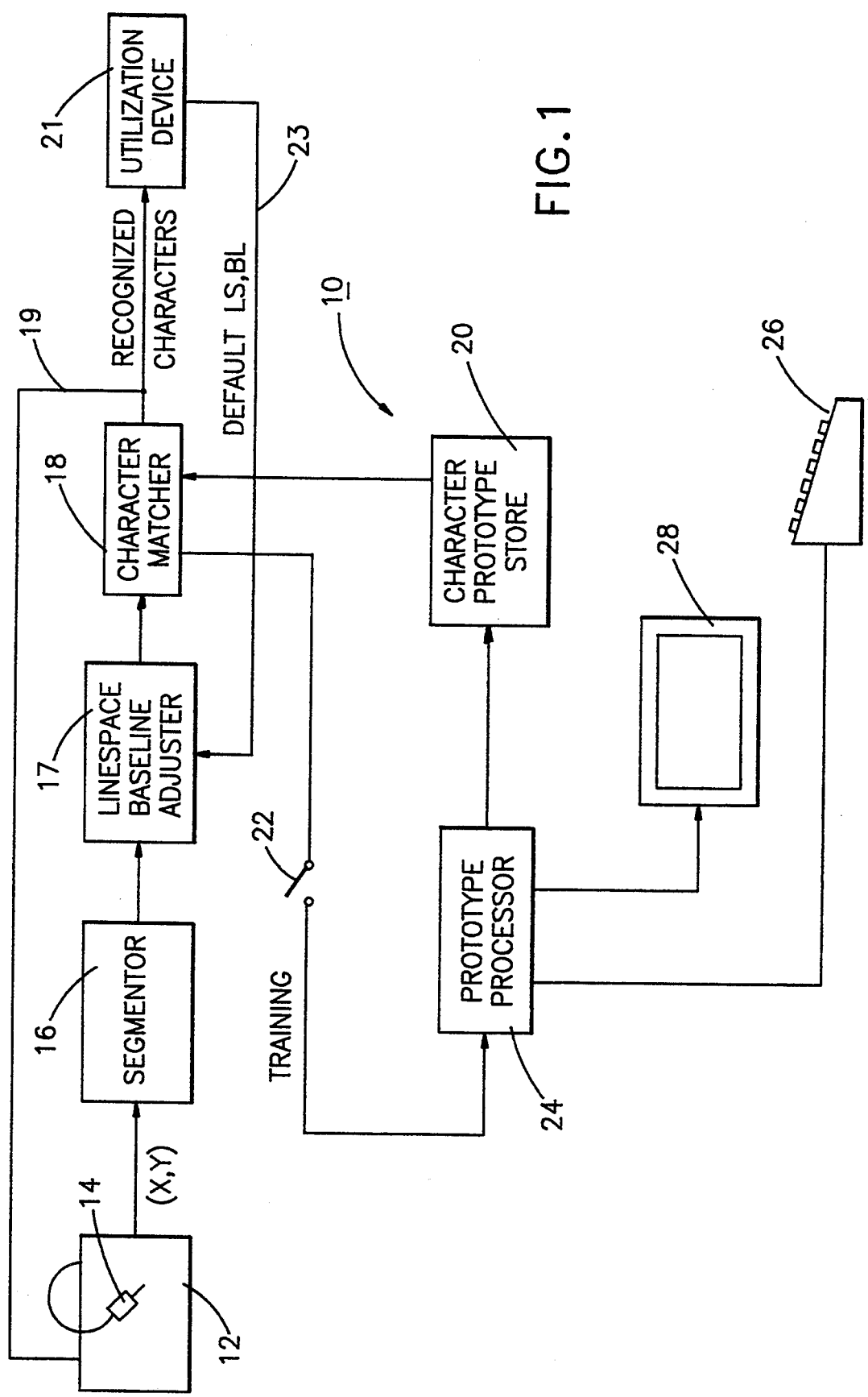
FIG. 1 is a simplified block diagram of a handwriting recognition system constructed and operated in accordance with the invention.

Referring to FIG. 1, there is shown an on-line handwriting character recognition system 10 constructed and operated in accordance with the invention. The system 10 could, for example, be an IBM Thinkpad Computer 700-T with a PenPoint operating system. System operation is described in users guide, IBM part number 41G3122. Thinkpad is a registered trademark of IBM Corporation, and PenPoint is a register trademark of GO Corporation. System 10 includes a handwriting transducer comprised of an integrated electronic tablet and display 12 having a writing implement, such as a stylus 14. In response to handwritten characters the transducer outputs a serial stream of (x,y) coordinate pairs corresponding to a position of the stylus 14 relative to a tablet 12 coordinate system. The coordinate pairs are provided to a stroke segmenter 16 that identifies a beginning and an end of discrete handwritten strokes. Strokes are provided to a LineSpace (LS), BaseLine (BL) adjuster 17 that estimates LS and BL for each character to provide normalized characters which results in greater character recognition accuracy. How this is achieved is explained in more detail shortly. Normalized strokes are provided to a character matcher 18. Character matcher 18 is coupled to a store 20 of predetermined character prototypes for comparing points of input strokes to points of stored character prototypes so as to identify, to within some probability, that an input stroke or assemblage of strokes represents a specific character. Recognized characters are output from the matcher 18 via line 19 to tablet and display 12 to display the recognized characters, or may be applied to a utilization device 21 such as a display, an application, such as a word processing program, or the like. The utilization device 21 may provide a default LS and BL to LS BL adjuster 17 to improve recognition accuracy. In some systems the functionality of the segmenter 16 and the character matcher 18 may be combined within one handwritten stroke processing unit.

Character prototypes may be provided to the store 20 during a training session held with a user of the system 10. The character prototypes may be entered by a specific user of the system and thereafter used when the specific user enters handwritten characters. Also, a global or universal set of character prototypes may be generated for use with more than one user.

In this regard a starter prototype set may be designed as an initial prototype set to be used by any writer on first using the system 10. If desired, a writer may then add character prototypes in his/her own writing style to obtain a prototype set tailored to the writer, also referred to as an individualized prototype set. In that a starter prototype set is typically created by an expert in handwriting recognition systems, there is no burden placed on a user of the system 10 to follow any writing suggestions or constraints.

In any case, during a training session characters from character matcher 18 are routed through a physical or logical switch 22 to a prototype processor 24, which for example may be an Intel '386 processor. The output of prototype processor 24 is a series of averaged prototype characters that are supplied to store 20 for subsequent use during a handwriting recognition session conducted with a user of the system 10.

Prototype processor 24 is also coupled to a user input and output device, such as a keyboard 26 and a display device 28 for controlling the operation of prototype processor 24 in the deletion of confusing prototypes as used during a handwriting recognition session conducted with a user of the system 10.

It is to be appreciated that the integrated electronic tablet and display 12 could be replaced by an electronic tablet not having a display, with display of characters being on the utilization device 21 or display 28.

The following is directed to the details of the functioning of the LS BL adjuster 17 for providing character recognition accuracy.

Text is generally written by a user a line at a time with the writing being folded over to the next line when a line is completed. The direction of the writing (left-to-right, right-to-left, etc.) varies according to the language being written. The techniques to be presented generalize across languages and writing directions. The following are definitions of terms used in describing the invention:

| Baseline | The natural line upon which the user places characters which do not have descender strokes. |
|---|---|
| Character height | The distance between the baseline and the top of a capital letter in the language being recognized. |
| Descender stroke | The portion of a character which extends below the natural line upon which the user is writing. The letters "g", "j", "p", "q" and "y" are examples of English letters which contain descender strokes. |
| Line spacing | The maximum positive distance from the baseline which can contain points pertaining to a character. |

FIG. 2 contains an example which presents line spacing 30, character height 32 and baseline placement 34. Since users generally do not write their capital letters to completely fill the space between adjacent baselines, character height is some percentage of line spacing. Lower case letters without ascenders and desenders are generally written to be about half the height of the line space value, while lower case letters with an ascender or desender are generally written to be about full line space value.

An analysis of handwritten text shows that it does not sit exactly on a baseline, even when one is suggested by a ruled writing surface. In addition, both character height and line spacing of handwriting vary over time. An example of this phenomena is presented in FIG. 3. Drifting of character height is shown at line 36; and drifting of both character height and baseline at line 40. It is this natural variation which requires on-going estimation of line spacing, baseline and character height values in a handwriting recognition system. The basic unit of input data is a stroke. A stroke is a writing from pen-down to pen-up. A character can consist of one or more strokes. Strokes can be handled one at a time, or can be grouped to a letter, a word or a line at a time. A grouping of strokes is called a segment.

Five progressively more detailed and accurate methods for estimating baseline, line spacing and character height in a handwriting recognition system is set forth below.

Default Estimation

It is possible to present baselines to a user on the writing surface and to assume that the user will write uniformly within these lines without any variation in the size of the characters written. In this model, it is assumed that capital letters are written to completely fill the space between adjacent baselines and that lower case letters are written to half this height. Descender strokes protrude half-way down into the next line. The baseline value in this mode of estimation is computed to be that value used to present the line to the user on the writing surface. The line spacing and character height values are computed to be the distance between adjacent baselines. This method works only for cooperative users and is shown in FIG. 4.

Simple Estimation

A second method of estimation is based upon the maximum and minimum y-coordinate values of a segment. Let $Y_{max}$ represent the maximum y-coordinate of a segment and $Y_{min}$ represent the minimum y-coordinate of the same segment. A baseline is estimated in this method to be equal to $Y_{min}$. Line spacing and character height is estimated to be $Y_{max} - Y_{min}$. This is shown in FIG. 5.

This method provides an estimate of the baseline, line spacing and character height values which can be computed very quickly and which can be used when the handwriting recognition system has not presented any lines on the writing surface to guide the user. However, it does not always have the required accuracy for good pattern matching. The existence of descender strokes, such as 42 and 44 in FIG. 5, in the segment provides a poor baseline estimate. Character height and line spacing estimates can be set to about half their correct values when the segment contains all half-height lower case letters without descender strokes. When the segment contains both capital letters and letters with descender strokes, line spacing and character height values are estimated to be about one and one-half times their correct values.

The end result of these weaknesses is that character pairs with similar shapes such as (C, c) and (P, p) can not be distinguished by the matcher.

Weighted Average Estimation

A better estimate of line spacing, character height and baseline values can be achieved through a computation which includes previously computed values and the weighted average of the maximum and minimum y-coordinates of all segments translated to this point. This is shown in FIG. 6. Let $LS_{old}$ represent the old line spacing estimate used by the system in its previous segment translation. Let $Y_{max}$ and $Y_{min}$ represent the maximum and minimum y-coordinate values of the current segment. Let $W_{old}$ and $W_{cur}$ represent weighing factors used to determine the relative influence of the previous and current segments in the computation of the new baseline, line spacing and character height values. Typically, $W_{old}$ and $W_{cur}$ are each in the range of 0-1.0 for initialization and are in the range of 0.3-0.7 for times other than initialization. Let $LS_{sys}$ represent the new line spacing and $BL_{sys}$ represent the new baseline value to be stored in the system. The sys estimated values can be computed by the following formulas:

$$LS_{sys} = (W_{old}*LS_{old} + W_{cur}*(Y_{max} - Y_{min}))/(W_{old} + W_{cur})$$

$$BL_{sys} = (W_{old}*LS_{old} + W_{cur}*Y_{min})/(W_{old} + W_{cur})$$

This method attempts to compensate for the weaknesses of the simple estimation method through reliance on values computed for previous segments. When there is enough writing, there should be a variety of letter heights and y-coordinate extents encountered. Extents are the minimum and maximum values. In particular, there should be segments which contain letters of full character height and which do not contain any descender strokes. By using a weighted average to compute line spacing and baseline position, these segments will serve to move the estimated baseline and line spacing values toward a correct estimate. When segments occur which have a descender stroke or which provide an incorrect estimate by the simple scheme, the affect of these segments on the estimated values are not as extreme as they would have been under the simple scheme. The estimated values instead move in the direction of the current segment's values slowly, especially when the weight depends on the number of strokes encountered so far. The movement of the estimated linespace 46 and estimated baseline 48 is shown with respect to time.

These formulas can not be applied blindly. There are shapes, such a period or a comma, that take only a small part of the linespace. These are identified and excluded from the application of the formula. A detailed description of weighted average estimation is set forth relative to FIG. 9.

Prototype Extraction Estimation

Figure 7:
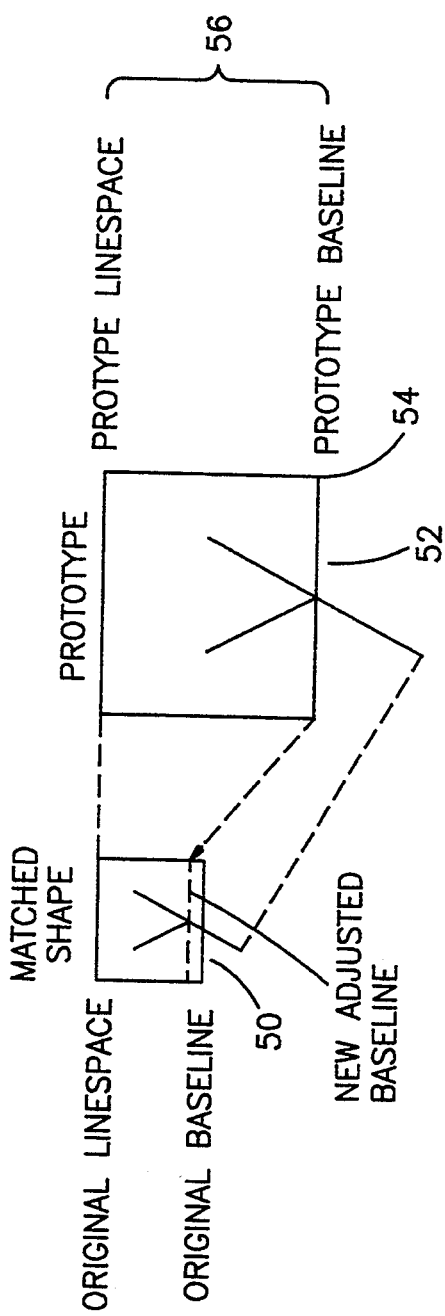
FIG. 7 is a diagram showing a prototype extraction estimation.

The weighted average estimation works well, but there is still room for improvement. When a segment has already been recognized and a new segment is ready to be recognized, the recognition result of the previous segment can be used to better estimate line spacing and baseline values, utilizing prototype extraction estimation as shown in FIG. 7.

Pattern matching involves mapping an unknown writing 50 to prototype space 52. Prototypes contain a label, line spacing, baseline, character height and letter shape information. The matching processes compares the unknown input to a set of pre-stored prototypes. The result of this process is the production for each prototype of a match score which represents how closely the unknown input matched the prototype. The label of the prototype with the best match score is generally selected as the result of the match process.

It is possible to reverse map the baseline 54 and line spacing 56 information contained in a prototype back to the coordinate system of the handwriting input space. When a prototype is selected as the best match to the unknown input, and when the match score for this prototype is better than a predefined threshold, a more accurate previous segment baseline and line spacing estimate can be obtained by reverse mapping from the selected prototype back to the handwriting space. Thus, assuming the pattern matching score for the previous segment was good, line spacing and baseline information extracted from the matched prototype can be used in the estimation formula.

Let $LS_{pro}$ represent the line spacing extracted from the prototype set using the previous match. Let $BL_{pro}$ represent the baseline information extracted from the prototype set from the previous match. Let $W_{pro}$ represent a weighing which determines how much effect these values have on the estimation computation. Typically, $W_{pro}$ and $W_{cur}$ are each in the range of 0–1.0 for initialization and are in the range of 0.3–0.7 for times other than initialization. $LS_{new}$ and $BL_{new}$ likewise represent the values computed by this method. The new estimated values can be computed by the formulas:

$$LS_{sys}=(W_{pro}*LS_{pro}+W_{cur}*LS_{new})/(W_{pro}+W_{cur})$$

$$BL_{sys}=(W_{pro}*BL_{pro}+W_{cur}*BL_{new})/(W_{pro}+W_{cur})$$

There exist situations where it is impossible or unadvisable to use baseline and line spacing values extracted from matched prototypes in calculation of the new values. For the very first segment matched (or first segment of a line for estimating baseline), there is no previous segment, and hence no matched prototype. Any estimate, such as measurements of writing lines, or values calculated from $Y_{min}$ and $Y_{max}$ can be used as the seed line spacing and baseline values in this case. In addition, some punctuation symbols such as period or comma are very short and take only a small fraction of the line spacing. These should not be used to adjust line spacing. To detect this situation, the $Y_{max}-Y_{min}$ of a segment is computed. If it is less than a predetermined threshold (defined as a fraction of old line spacing), line spacing value extracted from the prototype should not be used. By the same reasoning, to avoid shapes such as a single quote becoming a comma, if $Y_{min}$ of a segment is more than a threshold away from the old baseline value, the old baseline value should be used instead of the extracted value. This is explained in more detail relative to FIG. 10.

Extreme Point Clustering Estimation

The Prototype extraction estimation works very well but also has limitations. In particular, the system has to have already recognized at least one character on the line it is working on. This means it can't be used for the first character on any line. Extreme point clustering estimation is a pre-processor to recognition which solves this problem and provides better estimates than the previous methods.

Figure 8:
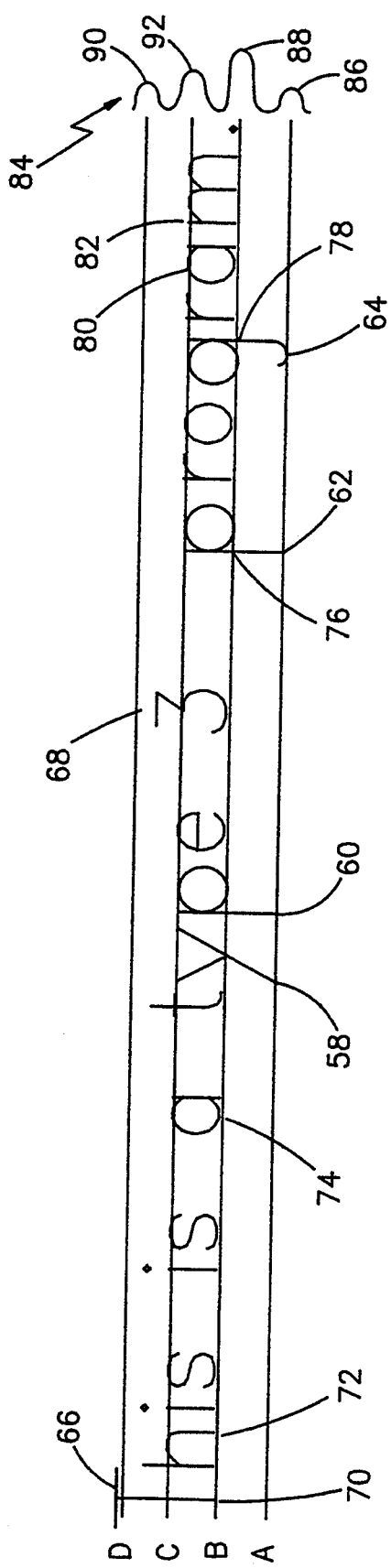
FIG. 8 is a diagram showing natural clustering of stroke y-coordinate extreme points.

Storing the $Y_{min}$ and $Y_{max}$ values for each stroke from the example shown in FIG. 8 results in a set of four groups of numbers which this method calls clusters. A cluster may also be termed a histogram. These clusters are calculated relative to lines A, B, C and D by calculating the number of points in the letters forming a line, fall on each of the lines A–D. Clusters are calculated for each line of characters written. Notice how all descender bottoms 58, 60, 62, and 64 tend to cluster around line A and how all upper case 64 and tall lower case tops 68 cluster around line D. Likewise the bottom of the upper case letters 70 and lower case without descenders, such as 72 and 74, cluster around the line B. Also clustered around line B are the mid-points, such as 76 and 78, of the lower case letters with descenders. The remaining clusters are around line C and are the tops of all the small lower case letters such as 80 and 82.

An initial line space is either passed in by the application or derived from the system metrics in effect at the time, or may not be provided at all. The application may also pass a baseline value which is used to set up the clusters. If the baseline is not known (either from application or from previous calculation) it is set to zero. Heuristics are applied to determine which of the clusters is most likely the baseline value. From this line space and baseline a preliminary set of four clusters are set up. The four clusters are shown in histogram 84 and are descender bottom 86, baseline 88, lower case top 90, and upper case (or tall lower case) top 92. This set of clusters 84 are the reference points used in determining a new baseline and line space.

Extreme point clustering has access to all the points in a given segment and extracts the $Y_{min}$ and $Y_{max}$ for each stroke and stores each in one of four possible clusters (based on which cluster each point is closest to). A weight (number of occurrences) is associated with each cluster and ranges from zero to a maximum of nine.

Once the clusters are set up heuristics are applied to determine which clusters represent the baseline and line space. A valid cluster is one that has a weight greater than zero (at least one point fell into that cluster). If less than two valid clusters are found, the original linespace and baseline values are used. If four valid clusters are found the baseline and line space are known and these values are used. When two or three valid clusters are found a determination is made regarding the type of data it represents. The most likely possibilities are mixed case (upper case and lower case with no descenders), all upper case, all lower case, lower case with descenders, or all numbers. A comparison to the reference cluster is a good indication of which values are known and the missing cluster(s) value(s) can be calculated from the valid known clusters. The new estimated values can be computed by the formulas:

$$LS_{sys}=(W_{old}*LS_{old}+W_{cur}*LS_{new})/(W_{old}+W_{cur})$$

$$BL_{sys}=(W_{old}*LS_{old}+W_{cur}*BL_{new})/(W_{old}+W_{cur})$$

For initialization, if predefined lines are used to write in, default values of LS and BL are used. If predefined lines are not used, $Y_{min}$ and $Y_{max}$ are computed to determine initial conditions.

Figure 11:
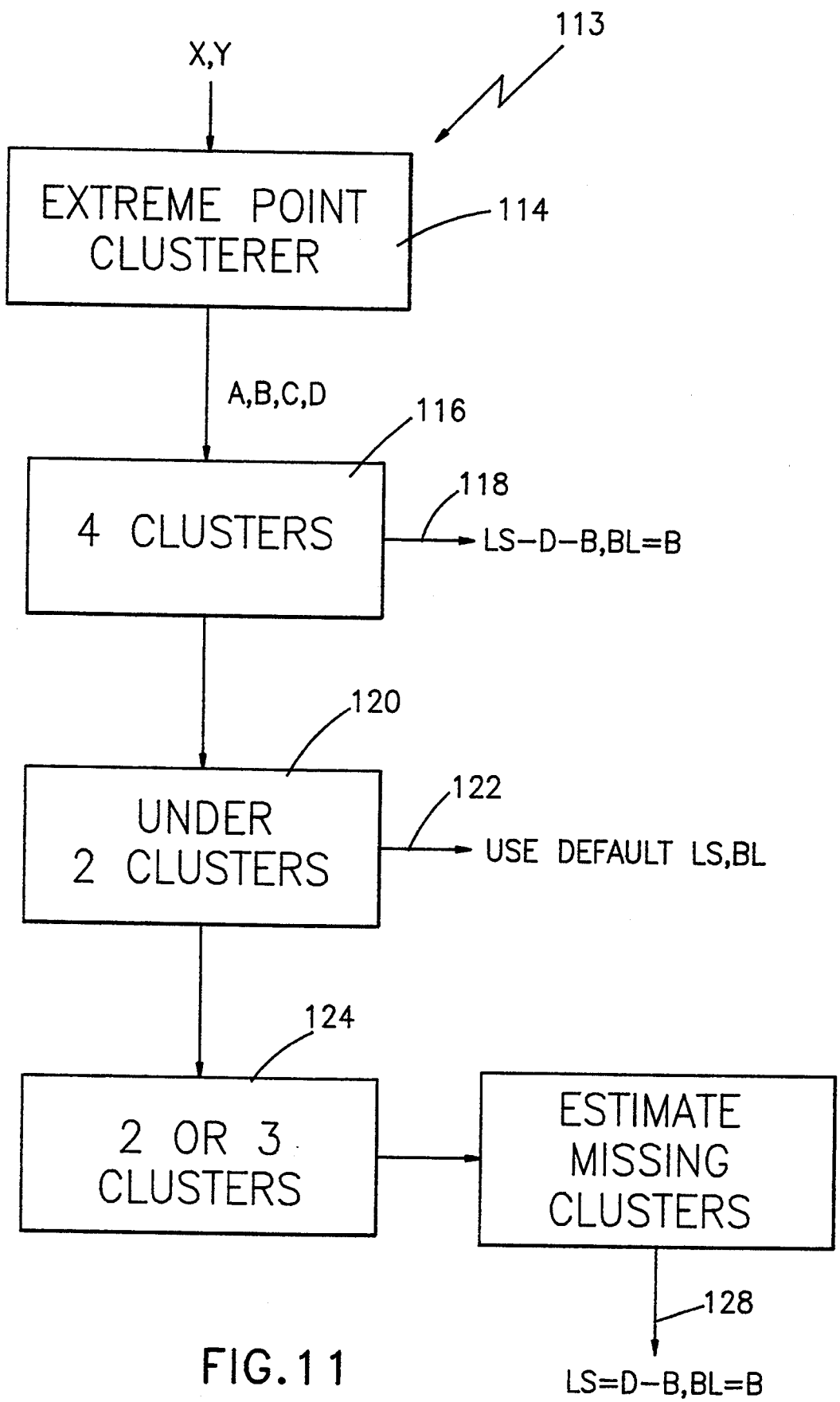
FIG. 11 is a block diagram of a system for providing extreme point clustering estimation.

A detailed description of extreme point clustering is set forth relative to FIG. 11.

Figure 9:
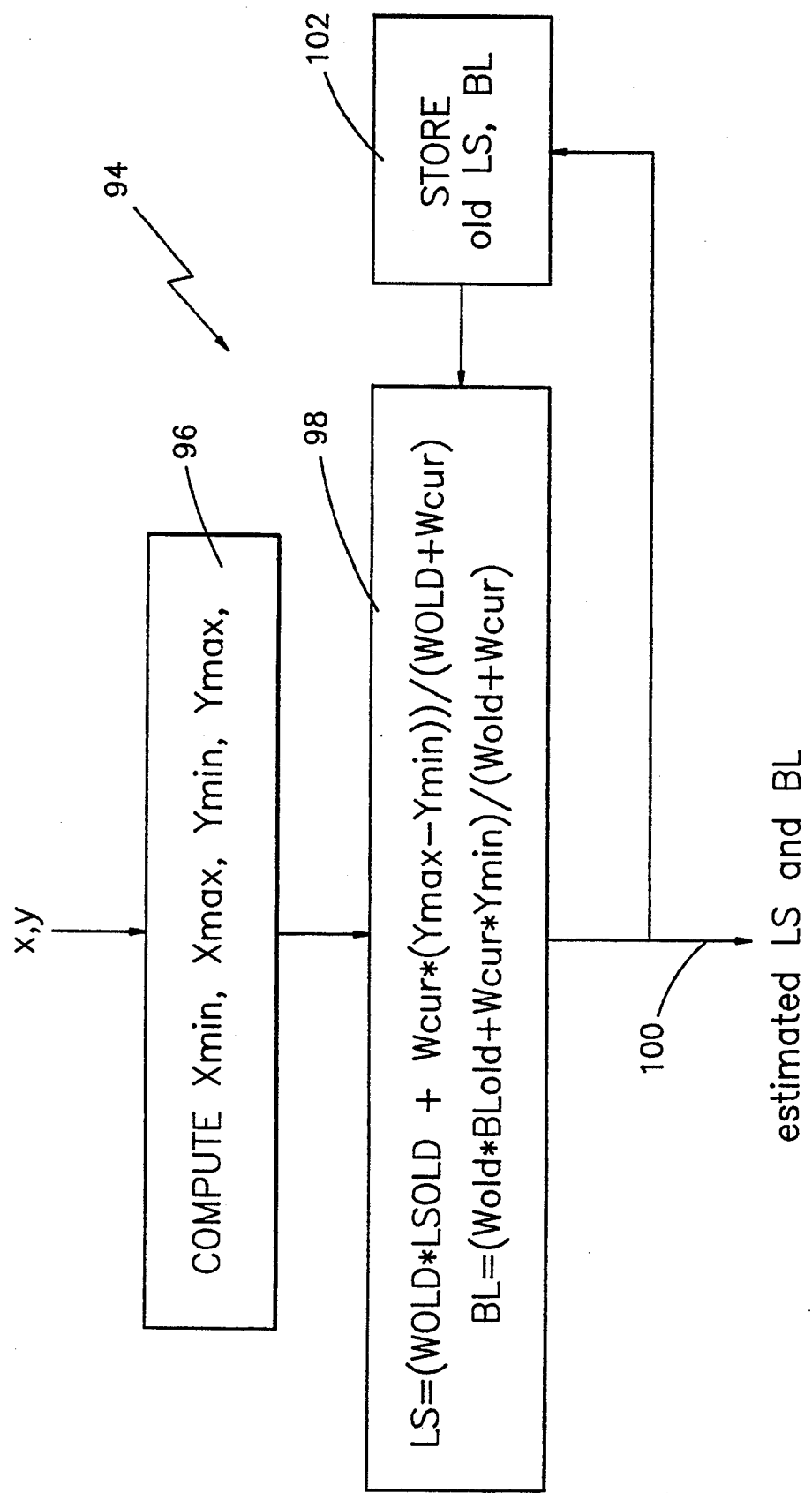
FIG. 9 is a block diagram of a system for providing weighted average estimation.

Refer now to FIG. 9 which is a detailed block diagram 94 of a weighted average estimator which was described generally with respect to FIG. 6, and which may be used as the line space baseline adjuster 17 shown in FIG. 1. The X,Y points making up each segment of a character are provided to block 96 where $Y_{min}$ and $Y_{max}$ are computed. The computed values of $Y_{min}$ and $Y_{max}$ are provided to block 98 where LS and BL for a given character are computed according to the formula:

$$LS_{sys}=(W_{old}*LS_{old}+W_{cur}*(Y_{max}-Y_{min}))/(W_{old}+W_{cur})$$

$$BL_{sys}=(W_{old}*BL_{old}+W_{cur}*Y_{min})/(W_{old}+W_{cur})$$

Estimated values of LS and BL are provided on line 100, and to block 102 where they are stored in $LS_{old}$ and $BL_{old}$ to be used in the calculation of LS and BL for the next character. These estimated values of LS and BL are used in FIG. 1 for the sampled character from segment 16 which are compared character matchers 18 with the prototype characters in character prototype store 20.

Figure 10:
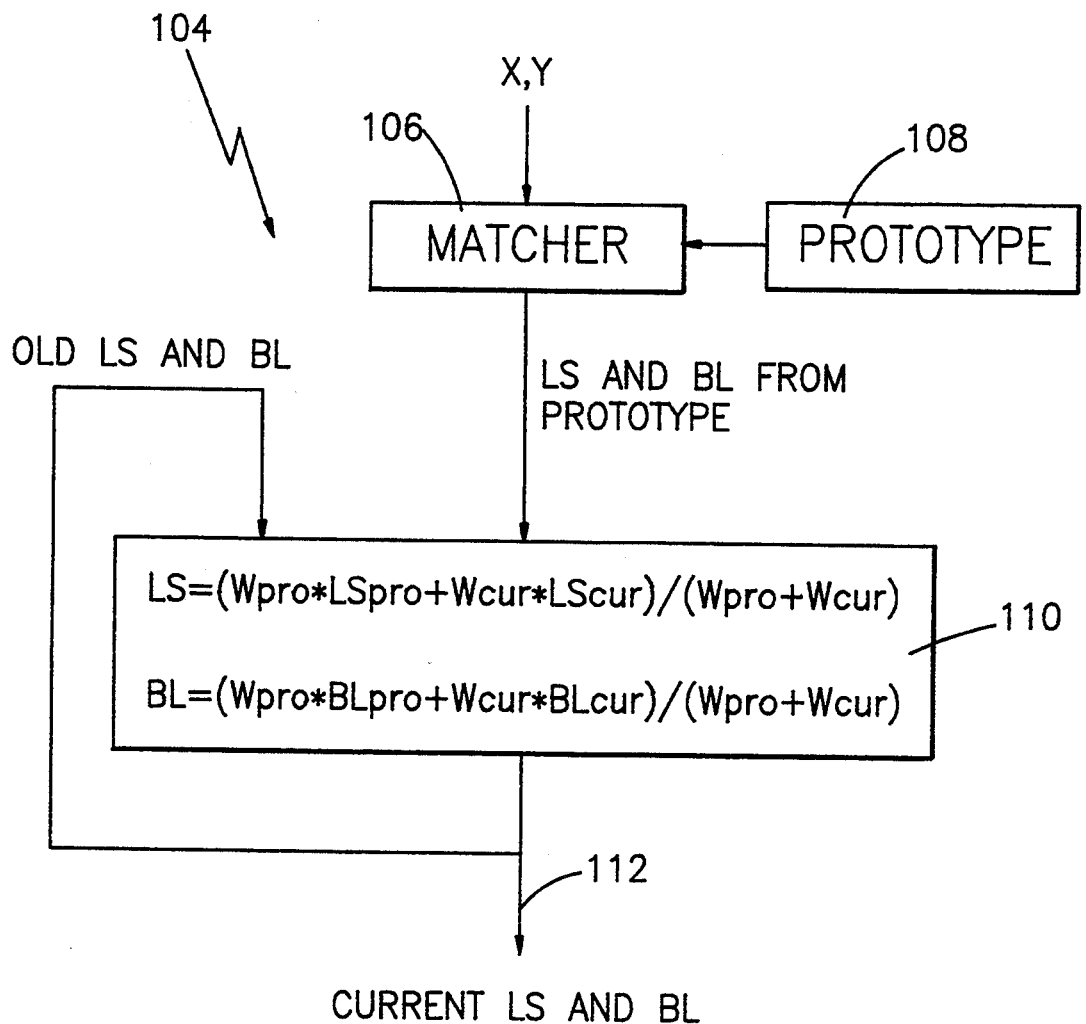
FIG. 10 is a block diagram of a system for providing prototype extraction estimation.

Refer now to FIG. 10 which is a detailed block diagram 104 of a prototype extraction estimator which was described generally relative to FIG. 7 and which may be utilized as the line space baseline adjuster 17 shown in FIG. 1. The X, Y points making up each segment of a character are provided to matcher block 106 which also receives LS and BL from prototype store block 108. The use of $LS_{pro}$ and $BL_{pro}$ from prototype store block 108 provides a more accurate computation than when using $Y_{min}$ and $Y_{max}$, because if the computation is for a lower case letter, the character height is not equal to the line spacing. The current LS and BL is computed in block 110 according to the formula:

$$LS_{sys}=(W_{pro}*LS_{pro}+W_{cur}*LS_{cur})/(W_{pro}+W_{cur})$$

$$BL_{sys}=(W_{pro}*BL_{pro}+W_{cur}*BL_{cur})/(W_{pro}+W_{cur})$$

$LS_{pro}$ and $BL_{pro}$ are derived from prototype block 108 and $W_{pro}$ and $W_{cur}$ are system constants which are experimentally determined. $LS_{pro}$ and $BL_{pro}$ are the line spaces and baseline, respectively, of the matched prototype of the last sampled character prior to the character presently being sampled. Typically, $W_{pro}$ and $W_{cur}$ are each in the range of 0-1.0 for initialization and are in the range of 0.3-0.7 for times other than initialization. The computation of the current LS and BL is provided on line 112, and to block 110 for the calculation of the next LS and BL.

Refer now to FIG. 11 which is a detailed block diagram 113 of an extreme point clustering estimator which was described generally relative to FIG. 8, may be used as the line space baseline adjuster 17 shown in FIG. 1. The X,Y points making up each segment of a character and default values of LS and BL are provided to block 114 where extreme point clusters A, B, C and D are computed as previously set forth relative to FIG. 8. If there are 4 clusters as indicated at block 116, the computed values of A, B, C and D are used, and LS and BL are computed at line 118 as follows:

$$LS=D-B$$

$$BL=B$$

At block 120, a determination is made if there are under two clusters. If so, the default values of LS and BL are utilized as indicated at line 122. There are under two clusters, for example, if only some special symbols such as a period and an equal sign are written. If there are not under two clusters, a determination is made at block 124 if there are 2 or 3 clusters. If so, an estimate of the missing clusters is made in block 126.

If there are 2 clusters, then the bottom cluster is compared against the old baseline. If the bottom cluster is greater than the old baseline plus ½ of the old linespace, then B is set to the bottom cluster. If the bottom cluster is not greater than the old baseline plus ½ of the old linespace, then B is set to the bottom cluster plus ½ of the old linespace. For both cases, D is set to B+(old linespace).

If there are 3 clusters, then the cluster that is closest to the old baseline is selected as a temporary new baseline T. If this temporary new baseline T is greater than old baseline plus ⅓ of old linespace, B is set to 0.9* (old baseline)+0.1*T. If T is not greater than old baseline plus ⅓ of old baseline, then B is set to 0.5*(old baseline)+0.5*T. For both cases, D is set to B+(old baseline).

In each instance, the values of D and B are utilized to compute Line Space (LS) and BaseLine (BL) at line 128 according to the formulas:

$$LS=D-B$$

$$BL=B$$

Figure 12:
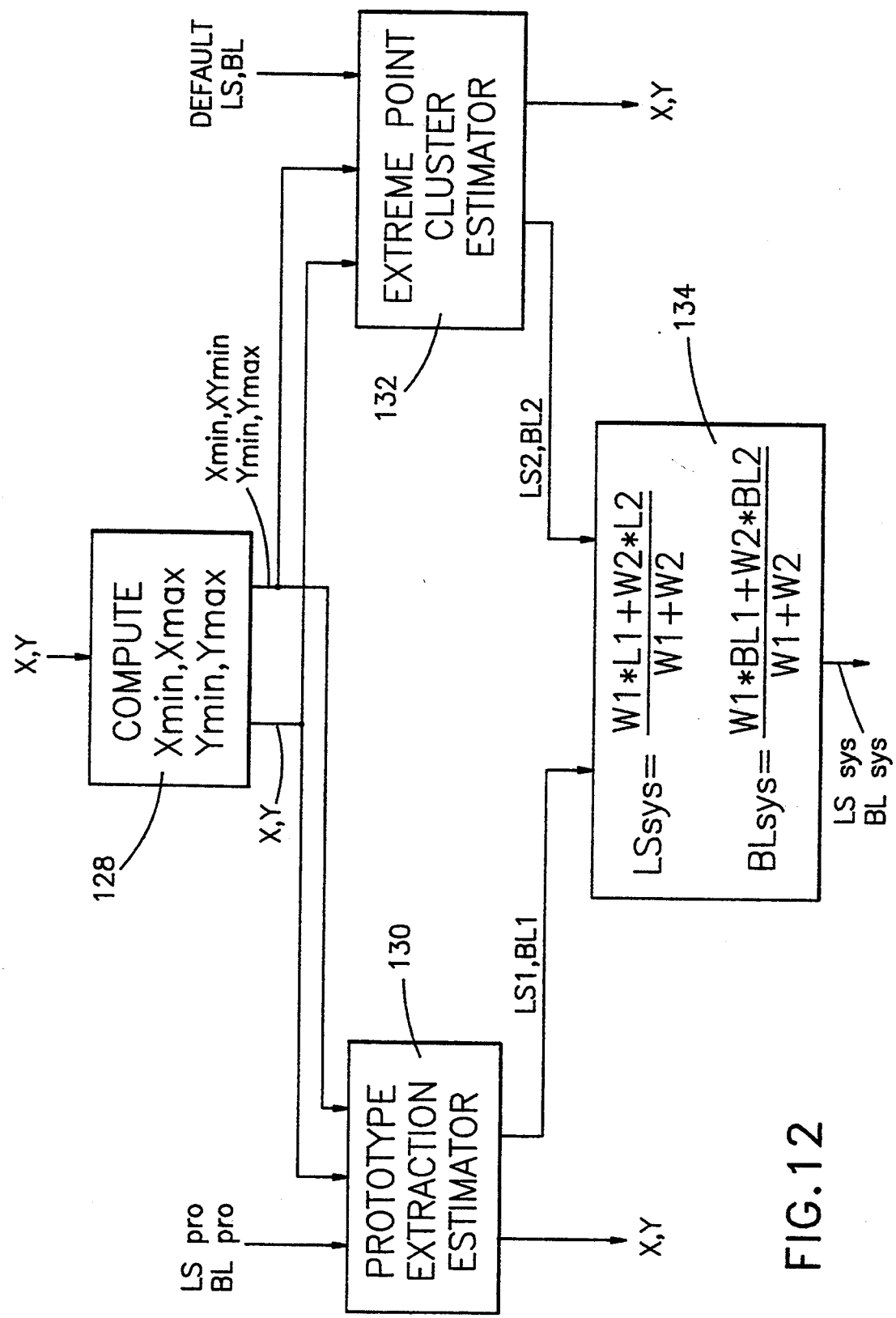
FIG. 12 is a block diagram of a system which combines prototype extraction estimation and extreme point clustering estimation.

Refer now to FIG. 12 which is a detailed block diagram 126 of a combination of a prototype extraction estimator and an extreme point clustering estimator which may be used as the line space baseline adjuster 17 shown in FIG. 1. The X, Y points making up each segment of a character are provided to block 128 where $X_{min}$, $X_{max}$, $Y_{min}$ and $Y_{max}$ are computed. The computed min/max values are provided to a prototype extraction estimator 130 and an extreme point cluster estimator 132. Prototype extraction estimator 130 also receives as inputs $LS_{pro}$ and $BL_{pro}$ and functions as explained relative to FIG. 10 to provide $LS_1$ and $BL_1$ to block 134. Extreme point cluster estimator 132 also receives as inputs default values of LS and BL and functions as explained relative to FIG. 11 to provide $LS_2$ and $BL_2$ to block 134. In block 134, $LS_{sys}$ and $BL_{sys}$ for a given character are computed according to the formula:

$$LS_{sys}=W_1*LS_1+W_2*LS_2/(W_1+W_2)$$

$$BL_{sys}=W_1*BL_1+W_2*BL_2/(W_1+W_2)$$

Typically, $W_1$ and $W_2$ are each in the range of 0-1.0 for initialization and are in the range of 0.3-0.7 for times other than initialization. LS and BL are provided to line 136.

The methods set forth above for estimating line spacing and baseline can be used for boxed writing, lined writing and freehand writing.

Industrial Applicability

It is an object of the invention to provide an improved line space and baseline adjuster in a handwriting recognition system.

It is another object of the invention to provide an improved line space and baseline adjuster in a handwriting system by utilizing weighted average estimation.

It is yet another object of the invention to provide an improved line space and baseline adjuster in a handwriting recognition system by utilizing prototype extraction estimation.

It is still another object of the invention to provide an improved line space and baseline adjuster in a handwriting recognition system by utilizing extreme point clustering estimation.

It is a further object of the invention to provide an improved line space and baseline adjuster in a handwriting recognition system by utilizing a combination of prototype extraction estimation and extreme point clustering estimation.

Having thus described our invention, what we claim as new, and desire to secure by Letters Patent is:

1. A method of adjusting line space and baseline in a handwriting recognition system, where a baseline is the natural line upon which a user places characters which do not have descender strokes, and line space is the maximum positive distance from the baseline which can contain points pertaining to a character, said method comprising the computer implemented steps of:

sampling a serial electrical data stream representing (X,Y) coordinate pairs corresponding to a position of a stylus relative to an electronic tablet's coordinate system for each character written on said electronic tablet;

producing, in response to the sampling step, an electrical representation of each character written on the tablet;

computing from the electrical representations a minimum value of Y points ($Y_{min}$) and a maximum value of Y points ($Y_{max}$) sampled for each character written on said tablet;

computing a line space (LS) for a given character to be:

$$LS = \frac{W_{old}*LS_{old} + W_{cur}*(Y_{max} - Y_{min})}{W_{old} + W_{cur}}$$

where: $LS_{old}$ is a previously computed value of LS; and $W_{old}$ and $W_{cur}$ are system constants;

computing a baseline (BL) for the given character to be:

$$BL = \frac{W_{old}*BL_{old} + W_{cur}*Y_{min}}{W_{old} + W_{cur}}$$

where: $BL_{old}$ is a previously computed value of BL;

converting the electrical representations of each character to an adjusted electrical representations reflecting the computed values of LS and BL.

2. The method of claim 1, wherein $W_{old}$ and $W_{cur}$ are each in the range of 0–1.0 for initialization and are in the range of 0.3–0.7 for times other than initialization.

3. A method of adjusting line space and baseline in a handwriting recognition system, where a baseline is the natural line upon which a user places characters which do not have descender strokes, and line space is the maximum positive distance from the baseline which can contain points pertaining to a character, said method comprising the computer implemented steps of:

storing electrical representations of a set of prototype characters, including a baseline ($BL_{pro}$) value and a line space ($LS_{pro}$) value for each such character;

sampling a serial electrical data stream representing (X,Y) coordinate pairs corresponding to a position of a stylus relative to an electronic tablet,s coordinate system for each character written on said electronic tablet;

providing an electrical representation of a sampled character for each character written on said tablet;

providing an electrical representation of a recognized character in response to comparing the electrical representation of a given sampled character with the stored electrical representations of the prototype characters, with the electrical representation of the recognized character being chosen to be the electrical representation of a prototype character which the electrical representation of the sampled character most closely matches;

converting the electrical representation of the next sampled character such that the next sampled character's baseline and line space are adjusted by $BL_{pro}$ and $LS_{pro}$, respectively, of the matched prototype of the last sampled character;

wherein the line space ($LS_{sys}$) of a just sampled character is:

$$LS_{sys} = \frac{W_{pro}*LS_{pro} + W_{cur}*LS_{new}}{W_{pro} + W_{cur}}$$

and wherein the baseline of the just sampled character is:

$$BL_{sys} = \frac{W_{pro}*BL_{pro} + W_{cur}*BL_{new}}{W_{pro} + W_{cur}}$$

where: $LS_{new}$ and $BL_{new}$ are the previously computed values of $LS_{sys}$ and $BL_{sys}$, respectively, and $W_{pro}$ and $W_{cur}$ are system constants.

4. A method of adjusting line space and baseline in a handwriting recognition system, where a baseline is the natural line upon which a user places characters which do not have descender strokes, and line space is the maximum positive distance from the baseline which can contain points pertaining to a character, said method comprising the computer implemented steps of:

(a) sampling a serial electrical data stream representing (X,Y) coordinate pairs corresponding to a position of a stylus relative to an electronic tablet's coordinate system for each character written on said electronic tablet;

(b) producing in response to the sampling an electrical representation of each character written on said tablet;

(c) providing a default value of LS and BL;

(d) storing electrical representations of the $Y_{min}$ and $Y_{max}$ numbers of each character in a line of characters;

(e) taking a histogram of the stored representations of the $Y_{min}$ and $Y_{max}$ numbers for a line of characters to determine a set of four groups of numbers, with each such group being termed a cluster; with the first cluster being indicative of a descender bottom of a character, the second cluster being indicative of a baseline, the third cluster being indicative of the top of a lower case character, and the fourth cluster being indicative of the top of a tall lower case character or the top of an upper case character or number;

(f) determining the number of clusters found as a result of taking the histogram;

(g) using the default values of LS and BL as the line space and baseline, respectively, of a sampled character in the line if under the two clusters are found;

(h) estimating the missing clusters if one of two and three clusters are found with the line space and baseline, respectively, of a sampled character in the line being computed as:

LS = fourth cluster - second cluster
BL = second cluster;

(i) if four clusters are found, computing line space and baseline, respectively, of a sampled character in the line as:

LS=fourth cluster - second cluster
BL=second cluster;

(j) converting, in response to step (f), the electrical representation of the sampled character to an adjusted electrical representation of the character which reflects an appropriate LS and BL from steps (g)–(i).

5. A method of adjusting line space and baseline in a handwriting recognition system, where a baseline is the natural line upon which a user places characters which do not have descender strokes, and line space is the maximum positive distance from the baseline which can contain points pertaining to a character, said method comprising the computer implemented steps of:

(a) storing electrical representations of a set of prototype characters, including a baseline ($BL_{pro}$) value and a line space ($LS_{pro}$) value for each such character;

(b) sampling a serial electrical data stream representing (X,Y) coordinate pairs corresponding to a position of a stylus relative to an electronic tablet's coordinate system for each character written on said electronic tablet;

(c) providing an electrical representation of a sampled character for each character written on said tablet;

(d) providing an electrical representation of a recognized character in response to comparing the electrical representation of a given sampled character with the stored electrical representations of the prototype characters, with the electrical representation of the recognized character being chosen to be the electrical representation of the prototype character which the electrical representation of the sampled character most closely matches;

(e) providing a first intermediate line space ($LS_1$) of a just sampled character as:

$$LS_1 = \frac{W_{pro}*LS_{pro} + W_{cur}*LS_{new}}{W_{pro} + W_{cur}}$$

(f) providing a first intermediate baseline of the just sampled character as:

$$BL_1 = \frac{W_{pro}*BL_{pro} + W_{cur}*BL_{new}}{W_{pro} + W_{cur}}$$

where: $LS_{new}$ and $BL_{new}$ are the previously computed values of $LS_{sys}$ and $BL_{sys}$, respectively, and $W_{pro}$ and $W_{cur}$ are system constants;

(g) providing a default value of LS and BL;

(h) storing electrical representations of the $Y_{min}$ and $Y_{max}$ numbers of each character in a line of characters;

(i) taking a histogram of the stored $Y_{min}$ and $Y_{max}$ numbers for a line of characters to determine a set of four groups of numbers, with each such group being termed a cluster; with the first cluster being indicative of a descender bottom of a character, the second cluster being indicative of a baseline, the third cluster being indicative of the top of a lower case character, and the fourth cluster being indicative of the top of a tall lower case character or the top of an upper case character or number;

(j) determining the number of clusters found as a result of taking the histogram;

(k) using the default values of LS and BL as a second intermediate line space $LS_2$ and baseline $BL_2$, respectively, of a sampled character in the line if under two clusters are found;

(l) estimating the missing clusters if one of two and three clusters are found with the second intermediate line space and baseline, respectively, of a sampled character in the line being computed as:

$LS_2$=fourth cluster - second cluster
$BL_2$=second cluster;

(m) if four clusters are found, computing the second intermediate line space and baseline, respectively, of a sampled character in the line as:

$LS_2$=fourth cluster - second cluster
$BL_2$=second cluster;

(n) computing a line space ($LS_{sys}$) of a sampled character to be:

$$LS_{sys} = \frac{W_1*LS_1 + W_2*LS_2}{W_1 + W_2}$$

(o) computing a baseline $BL_{sys}$ of the sampled character to be $$BL_{sys} = \frac{W_1*BL_1 + W_2*BL_2}{W_1 + W_2}$$

where $W_1$ and $W_2$ are system constants;

(p) converting, in response to step (j), the electrical representation of the sampled character to an adjusted electrical representation which reflects an appropriate line space and base line from steps (k)–(o).

6. The method of claim 5, wherein $W_1$ and $W_2$ are each in the range of 0–1.0 for initialization and are in the range of 0.3–0.7 for times other than initialization.

* * * * *